Figures 1, 2:
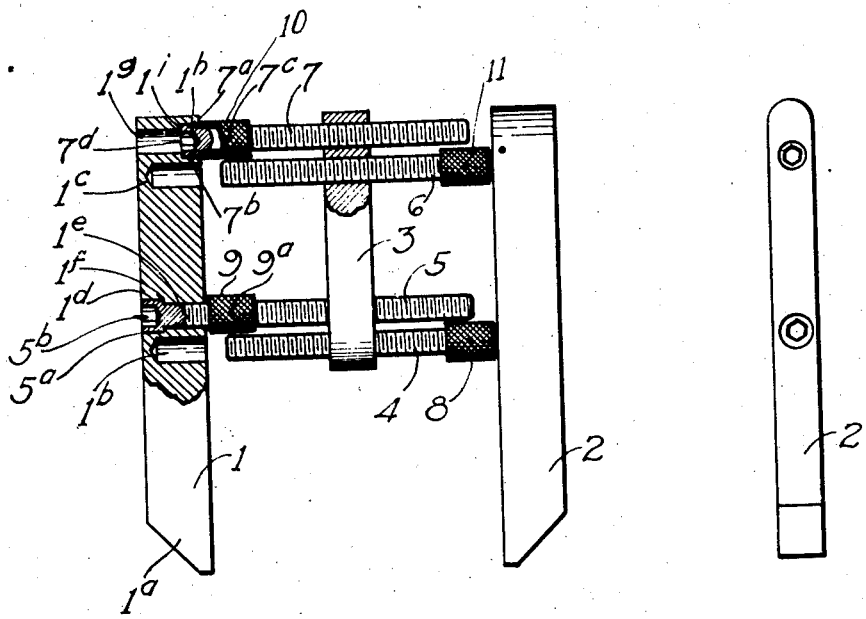

June 13, 1944.   H. ZIMMERMAN   2,351,178
CLAMPING DEVICE
Filed Feb. 10, 1942

INVENTOR.
HENRY ZIMMERMAN
BY A.B.Bowman
Attorney

Patented June 13, 1944

2,351,178

UNITED STATES PATENT OFFICE 2,351,178

CLAMPING DEVICE

Henry Zimmerman, Del Mar, Calif.

Application February 10, 1942, Serial No. 430,261

6 Claims. (Cl. 144—300)

My invention relates to a clamping device, more particularly adapted for tool makers' use and the objects of my invention are:

First, to provide a clamping device of this class which eliminates all outside projections;

Second, to provide a clamping device of this class with relatively large clamping range;

Third, to provide a clamping device of this class which holds the object or material clamped tightly;

Fourth, to provide a clamping device of this class in which the screws for operating the clamp are positioned in an intermediate screw holding member;

Fifth, to provide a clamping device which is easy to operate into and out of clamping position; and Sixth, to provide a clamping device of this class which is very simple and economical to manufacture, easy to operate, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a side elevational view of my clamping device showing portions broken away and in section to facilitate the illustration; Fig. 2 is a side edge view thereof.

Similar characters of reference refer to similar parts and portions throughout the several views of the drawing:

The clamp members 1 and 2, intermediate screw support 3, screw members 4, 5, 6 and 7 and knurled collars 8, 9, 10 and 11 constitute the principal parts and portions of my clamping device.

The clamp member 1 is a bar, preferably of steel and preferably rectangular in cross section, as shown. It is provided at its extended end with a tapered end portion 1a. It is provided near its middle with a smooth bore 1b and spaced slightly from its opposite end from the tapered portion 1a is another smooth bore 1c. These bores 1b and 1c are for the purpose of permitting the ends of the screw members 4 and 6 to pass thereinto when clamping small material. They are therefore large enough to provide clearance around the members 4 and 6. This clamping member 1 is also provided with a bore 1d in slightly spaced relation from the bore 1b and another smaller diameter bore 1e connecting therewith forming a shoulder 1f. Positioned in the member 1 in the bores 1d and 1e is a screw member 5 which is provided with a head 5a which fits in and substantially fills the larger bore 1d and positioned in the bore 1e is the body of the screw member 5, the bore 1e and 1b being sufficiently large to permit the screw member 5 to be readily turned therein. Secured on the screw member 5 adjacent the inner side of the clamp member 1 is a knurled collar 9 which is fitted tightly on the screw member 5 and further secured by means of a pin 9a.

Positioned near the end of the clamp member 1 outwardly of the bore 1c is another bore 1g which communicates with a larger diameter bore 1h, which is adapted to receive the head 7a and permits the revolution of said head of the screw member 7. This head is supported in position by a pin 7b which extends into an annular slot in the head 7a. The outer side of this head 7a rests against a shoulder 1i formed by the difference in diameter of the bores 1g and 1h. The screw member 7 is provided from the head for some distance with a knurled collar 10 to facilitate the turning of said screw by hand. Both of the screws 5 and 7 are provided with receiving recesses 7d and 5b for receiving a wrench to facilitate the turning of the same, it being noted that the wrench passes through the bore 1g to reach the recess 7b in the screw member 7.

It will be here noted that the clamp member 2 is exactly the same as the clamp member 1 throughout and that the screw member 4, together with its knurled collar 8 and its relation with the clamp member 2 is the same as the screw member 5 and its collar 9 and that the screw member 6, with its supporting pin and its relation with the clamp member 2 is the same as the screw member 7 so that they are interchangeable; that is the clamp member 2 is interchangeable with the clamp member 1. The screw member 4 is interchangeable with the screw member 5, and the screw member 6 is interchangeable with the screw member 7 and in its relation with the clamp members.

These screw members 4 to 7 inclusive are screw-threaded in and supported by the intermediate screw support 3 which is provided with four screw-threaded openings therethrough and arranged to fit the screw threads on the screw members 4 to 7 inclusive in their arranged relation with each other, as shown in Fig. 1 of the drawing, it being noted that the screw members 6 and 7 operate in compression in the clamping operation, while the screw members 4 and 5 operate in tension, therefore their different position and relation in the clamp members 1 and 2.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a clamping device of the class described, the combination of two spaced clamping members, a compression screw swively mounted at one of its ends within one end of each of said clamp members, a tension screw swively mounted at one of its ends within each of said clamp members near its middle and an intermediate screw support through which all of said screw members are screw threaded.

2. In a clamping device of the class described, the combination of two spaced clamping members, a compression screw swively mounted at one of its ends within one end of each of said clamp members, a tension screw swively mounted at one of its ends within each of said clamp members near its middle and an intermediate screw support through which all of said screw members are screw threaded, and means for holding said screw members in swivel relation within said clamp members.

3. In a clamping device of the class described, the combination of two spaced clamping members, a compression screw swively mounted at one of its ends within one end of each of said clamp members, a tension screw swively mounted at one of its ends within each of said clamp members near its middle, an intermediate screw support through which all of said screw members are screw threaded, and means for holding said screw members in swivel relation within said clamp members, said tension screw members being positioned in opposed relation to each other within said intermediate screw support.

4. In a clamping device of the class described, the combination of a pair of spaced clamp members, a screw support positioned intermediate said clamp members, screw members screw-threaded in said intermediate support in opposed relation to each other and swively mounted within said clamping members near one end in compression, other screw members screw-threaded in said intermediate member in spaced relation with said first mentioned screw members and in opposed relation to each other and swively mounted within said clamp members intermediate their ends in tension.

5. In a clamping device of the class described, the combination of a pair of spaced clamp members, a screw support positioned intermediate said clamp members, screw members screw-threaded in said intermediate support in opposed relation to each other and swively mounted within said clamping members near one end in compression, other screw members screw-threaded in said intermediate member in spaced relation with said first mentioned screw members and in opposed relation to each other and swively mounted within said clamp members intermediate their ends in tension, each of said screw members provided with a head revolubly mounted within its respective clamp member.

6. In a clamping device of the class described, the combination of a pair of spaced clamp members, a screw support positioned intermediate said clamp members, screw members screw-threaded through apertures in said intermediate support in opposed parallel relation to each other and provided with heads swively mounted within said clamping members near one end in compression, other screw members screw-threaded through apertures in said intermediate member in spaced relation therewith and in opposed parallel relation to each other and provided with heads swively mounted within said clamp members intermediate their ends in tension, each of said screw members provided with a head revolubly mounted within its respective clamp member, said screw members in tension provided with knurled collars arranged to engage the inner surfaces of said clamp members.

HENRY ZIMMERMAN.